United States Patent [19]

Crawford

[11] Patent Number: 4,616,318

[45] Date of Patent: Oct. 7, 1986

[54] SYSTEM FOR REPROJECTING IMAGES USING TRANSFORM TECHNIQUES

[75] Inventor: Carl R. Crawford, Haifa, Israel

[73] Assignee: Elscint, Inc., Boston, Mass.

[21] Appl. No.: 501,832

[22] Filed: Jun. 7, 1983

[51] Int. Cl.[4] ............................................. G06F 15/42
[52] U.S. Cl. ..................................... 364/414; 378/901
[58] Field of Search ......................... 364/414; 378/901

[56] References Cited

U.S. PATENT DOCUMENTS

| | | | |
|---|---|---|---|
| 4,205,375 | 5/1980 | Inouye et al. | 364/414 |
| 4,217,641 | 8/1980 | Naparstek | 364/414 |
| 4,219,876 | 8/1980 | Mizutani et al. | 364/414 |
| 4,222,104 | 9/1980 | Moore | 364/414 |
| 4,223,384 | 9/1980 | Hounsfield et al. | 364/414 |
| 4,433,380 | 2/1984 | Abele et al. | 364/414 |
| 4,482,958 | 11/1984 | Nakayama et al. | 364/414 |

OTHER PUBLICATIONS

Heffernan, Patrick B. et al., "Image Reconstruction from Incomplete Data: Iterative Reconstruction-Reprojection Techniques," *IEEE Trans. on Biomedical Engineering,* vol. BME-30, No. 12, Dec. 1983, 838-41.
Nassi, Menahem, et al., "Iterative Reconstruction-Reprojection: An Algorithm for Limited Data Cardiac-Computed Tomography," *IEEE Trans. on Biomedical Engineering,* vol. BME-29, No. 5, May 1982, 333-341.
Walters, Timothy E. et al., "Attenuation Correction in Gamma Emission Computed Tomography," *Journal of Computer Assisted Tomography,* vol. 5, No. 1, Feb. 1981, 89-94.
Harris L. D. et al., "Display and Visualization of Three-Dimensional Reconstructed Anatomic Morphology: Experience with the Thorax, Heart, and Coronary Vasculature of Dogs," *Journal of Computer Assisted Tomography,* vol. 3, No. 4, Aug. 1979, 439-446.
Stonestrom, J. Peter, et al., "A Framework for Spectral Artifact Corrections in X-Ray CT", *IEEE Transactions on Biomedical Engineering,* vol. BME-28, No. 2, Feb. 1981, 128-141.
Glover, G. H., et al., "An Algorithm for the Reduction of Metal Clip Artifacts in CT Reconstruction", *Medical Physics,* vol. 8, No. 6, Nov. 1981, 799-807.
Henrich, G., "A Simple Computational Method of Reducing Streak Artifacts in CT Images", *Computed Tomography,* vol. 4, 1981, 67-71.
Peters, T. M., "Algorithms for Fast Back- and Re-Projection in Computed Tomography", *IEEE Transactions on Nuclear Science,* vol. NS-28, No. 4, Aug. 1981, 3641-3647.

*Primary Examiner*—Jerry Smith
*Assistant Examiner*—Clark A. Jablon
*Attorney, Agent, or Firm*—Sandler & Greenblum

[57] ABSTRACT

Systems and methods are presented for reprojecting images which comprise taking the two-dimensional Fourier transform of the image, interpolating the transform in order to obtain the values on radial lines, and taking the inverse one-dimensional Fourier transforms of the radial lines.

12 Claims, 2 Drawing Figures

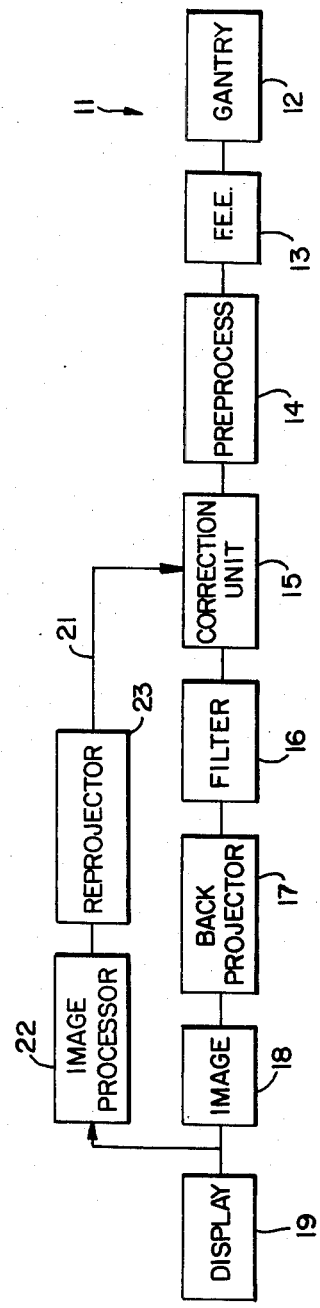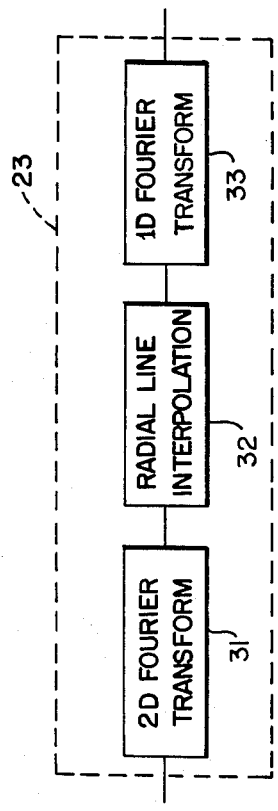

SYSTEM FOR REPROJECTING IMAGES USING TRANSFORM TECHNIQUES

FIELD OF THE INVENTION

This invention is concerned with computer generated images and more particularly with systems for reprojecting such images for artifact correction or other purposes.

BACKGROUND OF THE INVENTION

This invention is related to the invention of a patent application filed on June 2, 1983, bearing Ser. No. 500,347, and assigned to the assignee of this invention.

The evolution of x-ray computed tomography (CT) has produced scanners with decreasing data acquisition and image reconstruction times and improved density and spatial resolutions. The improvements have been achieved primarily by the use of more sophisticated data acquisition systems and faster image reconstruction hardware. The image quality has also been improved by reevaluating assumptions made in order to build the early generations of CT scanners and to incorporate corrections and/or refinements in these assumptions within the image reconstruction algorithm. These assumptions were initially made in order for the data collected by an actual scanner to be compatible with theoretical reconstruction algorithms.

An example of these assumptions has to do with the spectrum of the x-ray source and the energy dependence of the attenuation coefficients of different elements of the object under examination. An important assumption used in the past to produce images is that the source is monochromatic or that the energy dependence of the attenuation coefficients is identical for all elements. It is well known that neither of these two conditions is satisfied and hence what is known as polychromatic artifacts are produced in resulting images. The artifacts can be identified as cupping and as negative streaks between sharp objects that have high attenuation coefficients.

The prior art, see for example U.S. Pat. No. 4,217,641, uses an iterative post-reconstruction method to reduce the level of polychromatic artifacts. Among other known prior art describing polychromatic artifact correction techniques are: U.S. Pat. Nos. 4,222,104 and 4,223,384 as well as an article entitled "A Framework for Spectral Artifact Corrections in X-ray Computed Tomography," by J. Peter Stonestrom, et. al., in the IEEE Transactions on Biomedical Engineering, Vol. BME-28, No. 2, February 1981.

The basis of these prior art post-reconstruction correction methods is that objects are made up of two approximately homogeneous components with respect to the energy dependence of their attenuation coefficients. In biological applications the two components are bone and soft tissue. An initial image is reconstructed incorporating first-order polychromatic corrections for the majority element, usually soft tissue. The initial image is then segmented on a pixel-by-pixel basis in order to generate approximate images of the two components. The path lengths are then calculated through the two images using reprojection techniques. Error projections are then formed from the reprojections and added to the projection data that was used to form the initial image. A second-order image is then reconstructed from the new projection data. If the level of polychromatic correction is sufficient, then the algorithm is complete. If not, the above procedure is repeated.

The use of reprojection is not limited to polychromatic correction algorithms. The paper "An Algorithm for the Reduction of Metal Clip Artifacts in CT Reconstructions," by G. H. Glover and N. J. Pelc, in Medical Physics, Vol. 8, No. 6, November 1981, presents a method to remove the artifacts caused by metal clips using reprojection as part of their algorithm. The paper "A Simple Computational Method for Reducing Streak Artifacts in CT Images," by G. Henrich, in Computed Tomography, Vol. 4, 1981, describes an algorithm that can be used to remove streaks such as those caused by partial volume artifacts.

The polychromatic-, metal clip-, and streak-artifact correction algorithms described in the prior art have not been implemented commercially because the reprojection step has been extremely time-consuming. The prior art reprojection methods have been too slow because they relied upon the inherent reprojection step incorporated in the reconstruction algorithms based on algebraic techniques. The slowness of the prior art reprojection systems and an attempted solution are highlighted in a paper "Algorithms for Fast Back- and Reprojection in Computed Tomography," by T. M. Peters, in IEEE Transactions on Nuclear Science, Vol. NS-28, No. 4, August 1981. The paper presents a method that uses a modified backprojector to obtain reprojections. The problem with this system is that the modifications radically change the hardware of a backprojector and thus the system is not readily applicable to commercial applications. The system requires means to reverse the normal data flow through the backprojector, resulting in reprojections at the normal input of the unit. In addition, the resulting reprojections are of poor quality and require complex corrections in order to use them with an artifact correction algorithm.

Accordingly there is a long-standing need for fast reprojection techniques and equipment.

BRIEF DESCRIPTION OF THE INVENTION

According to a preferred embodiment of the invention, a system for reprojecting images using transform techniques is provided; said system comprising:

means for determining the two-dimensional Fourier transform of an image, means for interpolating the values of the Fourier transform of the image in order to obtain the values of the transform along radial lines, and means for finding the one-dimensional inverse Fourier transform of the radial lines.

A feature of the invention is the use of the reprojected values for correcting polychromatic artifacts.

The required polychromatic correction method is accomplished by exploiting the inherent parallelism available in a discrete implementation of a Fourier transform in digital electronics in order to provide reprojections in a time comparable to the normal backprojection time, thereby enabling the implementation of a commercially viable polychromatic correction system.

BRIEF DESCRIPTION OF THE DRAWINGS

The above mentioned and other objects and features of the invention will be better understood in conjunction with the following description of the invention taken in conjunction with the accompanying drawings, wherein:

FIG. 1 is a block diagram showing an embodiment of a reprojection system used to correct polychromatic artifacts; and FIG. 2 is an expanded block diagram of the reprojection system shown in FIG. 1.

GENERAL DESCRIPTION

The CT Scanner system 11 of FIG. 1 comprises the gantry 12. The subject is exposed to radiation in the gantry 12 and the radiation is detected after traversing the subject. The detected signals are treated in the block 13 labelled FEE for Front End Electronics. The electrical signals are preprocessed by the processor 14. The output signals of 14 are called projections. The output of 14 is passed through to the correction unit 15. The unit performs a first-order polychromatic correction on the projections in order to generate the initial image.

The output of the correction unit 15 is passed to the filter 16. The filtered projections are backprojected by backprojector 17. The output of the backprojector is passed in the form of a digitized image in matrix 18. The matrix of digitized data is used to provide images on display device 19.

Polychromatic error corrections are provided in the feedback loop 21 extending from the output of the backprojector 17 to the polychromatic error correction unit 15. In the polychromatic correction mode, the output of feedback loop 15 is combined with the output of 14 and then passed to the filter 16.

The feedback loop 21 contains processing unit 22 and the reprojector 23. Processing unit 22 is designed, in a preferred embodiment, to distinguish between pixels of bone or soft tissue. The output of unit 22 is connected to the reprojector 23.

An expanded view of reprojector 23 can be seen in FIG. 2. The output of process unit 22 is passed to unit 31 which calculates a two-dimensional Fourier transform. The values of the Fourier transform, available at the output of 31, are interpolated by unit 32 in order to form radial lines of the transform of the processed image. Reprojections of the processed image are obtained by unit 33 which forms the one-dimensional inverse Fourier transform of the radial lines of the two-dimensional transform of the processed image.

To better explain the present system, a brief description of the mathematics of reprojection follows.

Consider function f(x,y) which represents a reconstruction of a cross-section of an object and the path characterized with $(\theta,t)$ given by:

$$t = x^* \cos(\theta) + y^* \sin(\theta), \quad (1)$$

where $|t| < \infty \text{ps}$
$|\theta| < \pi/2.0.$

A sample, $p(\theta,t)$, of the reprojection of the object function along the path characterized with $(\theta,t)$, is given by:

$$p(\theta,t) = \int_{-\infty}^{\infty} \int_{-\infty}^{\infty} f(x,y)\delta(t - x^*\cos(\theta) - y^*\sin(\theta))dxdy, \quad (2)$$

where $\delta(z)$ is a normal
$\delta$-function described by:

$$\int_{-\infty}^{\infty} \delta(z)g(z)dz = g(0). \quad (3)$$

The integration in (2) is over strips of zero width. A strip of non-zero width can be incorporated into (2) by replacing the $\delta$-function with the normalized cross-section of the strip. The normalization ensures that the integral of the cross-section of the desired aperture function is unity.

The inverse Fourier slice theorem will now be derived in order to show that an inverse Fourier transform of a radial line of the two-dimensional Fourier transform of the object function is a reprojection of the same object function.

Let $F(u,v)$ be the two-dimensional Fourier transform of the object function $f(x,y)$. The transform is given by:

$$F(u,v) = \int_{-\infty}^{\infty} \int_{-\infty}^{\infty} f(x,y) * \exp(-j * 2 * \pi * [u^* x + v^* y])dxdy. \quad (4)$$

Now consider $F(u,v)$ in a polar coordinate system. Let $\omega$ and $\phi$ be the variables that characterize the polar coordinate system. They are related to 'u' and 'v' as follows:

$$u = \omega^* \cos(\phi) \quad (5)$$

$$v = \omega^* \sin(\phi). \quad (6)$$

$F(\phi,\omega)$ can be found by substituting (5) and (6) into (4):

$$F(\phi,\omega) = \int_{-\infty}^{\infty} \int_{-\infty}^{\infty} f(x,y) * \exp(-j * 2 * \pi * \omega * w)dxdy, \quad (7)$$

where we have assumed that the notation $F(\phi,\omega)$ implies a polar coordinate representation instead of rectilinear coordinate system implied with the use of $F(u,v)$ and that 'w' is given by:

$$w = x^* \cos(\phi) + y^* \sin(\phi). \quad (8)$$

For a fixed value of $\phi$, $F(\phi,\omega)$ represents a radial line of the two-dimensional Fourier transform of the object function. Consider the one-dimensional inverse Fourier transform, $g(\phi,z)$, of a radial line given by a fixed value of $\phi$. The function $g(\phi,z)$ is given by:

$$g(\phi,z) = \int_{-\infty}^{\infty} F(\phi,\omega) * \exp(j * 2 * \pi * \omega * z)d\omega. \quad (9)$$

Equation (9) can be evaluated when one substitutes (7) into (9). The result is:

$$g(\phi,z) = \int_{-\infty}^{\infty} \int_{-\infty}^{\infty} \int_{-\infty}^{\infty} f(x,y) * \quad (10)$$

$$\exp(-j * 2 * \pi * \omega * w)dxdy * \exp(j * 2 * \pi * \omega * z)d\omega.$$

Now change the order of integration in (10) to obtain the following:

$$g(\phi,z) = \int_{-\infty}^{\infty} \int_{-\infty}^{\infty} f(x,y) * \qquad (11)$$

$$\int_{-\infty}^{\infty} \exp(j * 2 * \pi * \omega * [z - w]) d\omega \, dxdy.$$

It is easy to show that the inner integral in (11) reduces to:

$$\delta(z - x^* \cos(\phi) - y^* \sin(\phi)), \qquad (12)$$

where (12) was obtained with the substitution of the definition of 'w' given in (8).

Now substitute (12) into (11) to obtain:

$$g(\phi,z) = \int_{-\infty}^{\infty} \int_{-\infty}^{\infty} f(x,y) \delta(z - x * \cos(\phi) - y * \sin(\phi)) dxdy. \qquad (13)$$

Now compare the standard definition of a reprojection given in (2) to (13) with $\theta$ and 't' replaced with $\phi$ and 'z', respectively. One can easily see that $g(\phi,z)$ is the reprojection at $\phi$. This fact leads to the following method to find reprojections of an object:

[1] Determining the two-dimensional Fourier transform of an object function.

[2] Taking the one-dimensional Inverse Fourier transform of a radial line of the Fourier transform of the object function in order to obtain a reprojection at the angle characterizing the radial line.

In an actual implementation of the method presented above, one has to use discrete Fourier transforms (DFT) instead of the implied continuous Fourier transforms. It will now be shown how the above method can be extended so that it can be implemented in an actual hardware.

Consider the discrete sequence x(i), for i=0,1, ..., N−1. Its DFT, X(k), for k=0,1,...,N−1, is given by:

$$X(k) = \sum_{i=0}^{N-1} x(i) * \exp(-j * 2 * \pi * i * k/N). \qquad (14)$$

The inverse DFT, IDFT, is given by:

$$x(i) = (1/N) * \sum_{i=0}^{N-1} X(k) * \exp(j * 2 * \pi * i * k/N). \qquad (15)$$

Assume that x(i) represents samples in time of x(t). The distance between samples is given by d t. One can show under certain conditions that X(k) represents samples of the continuous Fourier transform, X(f), of x(t). The distance between samples in the frequency domain, d f, can be shown to be given by:

$$d\_f = 1/(N * d\_t). \qquad (16)$$

Assume that x(i) is related to x(t) as follows:

$$x(i) = x(i * d\_t),$$

$$i = 0, 1, \ldots, N/2$$

$$x(i) = x([i-N] * d\_t),$$

$$i = N/2 + 1, \ldots, N-1. \qquad (17)$$

Then X(k) is related to X(f) (within a scale factor) as follows:

$$X(k) = X(k * d\_f),$$

$$k = 0, 1, \ldots, N/2$$

$$X(k) = X([k-N] * d\_f),$$

$$k = N/2 + 1, \ldots, N-1. \qquad (18)$$

The relationships given in (17) and (18) are a consequence of the periodicity requirements of a DFT. One notices in these equations that the negative time or frequency domain portions follow the positions of the positive domains. The order can be reversed by modulating the sequences by an alternating $+1/-1$ sequence in both domains.

The use of the one-dimensional DFT will now be extended so that it can be used to find the two-dimensional DFT of an image.

Assume that the reconstructed image can be contained in a circle of radius RO. Also assume that a NPIC×NPIC reconstruction is made of this object function. The reconstruction, f(i,m), can be related to the original object function as follows:

$$f(i,m) = f(x,y), \qquad (19)$$

for $$x = -RO + i * DGRID \qquad (20a)$$

$$y = -RO + m * DGRID \qquad (20b)$$

$$DGRID = 2.0 * RO/NPIC, \qquad (21)$$

and 'i' and 'm' lie in the range [0,NPIC).

The two-dimensional discrete Fourier transform of f(i,m), F(k,l), is defined by:

$$F(k,l) = \sum_{i=0}^{NPIC-1} \sum_{m=0}^{NPIC-1} f(i,m) * \qquad (22)$$

$$\exp(-j * 2 * \pi * [i * k/NPIC + m * l/NPIC]).$$

Because the exponential term in (22) is separable, (22) can be written as follows:

$$F(k,l) = \sum_{m=0}^{NPIC-1} G(k,m) \exp(-j * 2 * \pi * m * l/NPIC), \qquad (23)$$

where G(k,m) is given by:

$$G(k,m) = \sum_{i=0}^{NPIC-1} f(i,m) \exp(-j * 2 * \pi * i * k/NPIC). \qquad (24)$$

Upon examination, one sees that both (23) and (24) represent standard one-dimensional DFT's. The method implied by (23) and (24) is to first find the DFT's of all of the rows of the image and then take the DFT's of the columns of the DFT's of the rows.

A major problem when one uses DFT's instead of continuous Fourier transforms is that the resulting discrete transforms are available on a rectilinear grid. The desired radial lines actually represent samples obtained in a polar coordinate representation of the transform.

Thus some form of interpolation is required to transform the rectilinear representation into a polar coordinate representation. One can now easily extend (18), using (19-21), to two dimensions so that F(k,l) can be related to F(u,v) in order to derive the constants required by the interpolation process.

Thus, using two-dimensional interpolation, one can use the samples given in (23) to find the samples of the Fourier transform along a radial line. This function can then be passed to a IDFT to find the reprojection of the object function at the angle of the radial line.

It is well known that a DFT can be implemented using more optimum techniques than direct implementation of (14) or (15). These methods are known as fast Fourier transforms (FFT). One can show that the FFT can be implemented in a much shorter time than the corresponding DFT for vectors with a large number of samples. The savings in time obtained by the use of a FFT also reduces sufficiently the time neeeded to obtain reprojections so that this system can be used for clinically viable artifact correction.

While the principles of the invention have been explained in connection with specific methods and equipment, it should be understood that the disclosure has been made by way of example only. Numerous changes can be made to the example given without departing from the spirit and scope of the invention as defined in the accompanying claims.

What is claimed is:

1. A system for reprojecting images comprising:
   means for detecting radiation attenuated by passing through a subject,
   means for preprocessing said detected radiation to obtain data corresponding to projections of said detected radiation,
   means for filtering said data to obtain filtered data,
   means for backprojecting said filtered data to obtain digital images,
   feedback for feeding back said digital images,
   means for taking the two dimensional Fourier transforms of the image in the feedback means,
   means for obtaining the values of the Fourier transforms of the image along radial lines using interpolation, and
   means for forming the one-dimensional inverse Fourier transform of the radial lines to obtain data corresponding to reprojections.

2. The system of claim 1 wherein said means for obtaining the value of the Fourier transform comprises means for using Fast Fourier transforms.

3. The system of claim 1 wherein said means for obtaining the value of the Fourier transform comprises means for using discrete Fourier transforms.

4. A system for correcting for artifacts in images obtained in computerized tomographic devices said system comprising:
   means for detecting radiation attenuated by passing through a subject,
   means for preprocessing said detected radiation to obtain data corresponding to projections of said detected radiation,
   means for filtering said data,
   means for back projecting said filtered data to obtain digital images,
   feedback loop means including reprojection means using said digital image for obtaining correction data, said feedback loop means including Fourier transform calculating means, and
   means for combining said correction data to said preprocessed data to correct artifacts in said image.

5. The system of claim 4 wherein said reprojection means includes:
   means for determining two-dimensional Fourier transforms of the digitized image,
   means for converting said transforms to transforms represented in polar-coordinates, and
   means for determining the inverse one-dimensional Fourier transforms along radial lines of said polar-coordinate transforms.

6. A method of reprojecting images including the steps of:
   detecting radiation attenuated by passing through a subject,
   obtaining data corresponding to projections of said detected radiation,
   filtering said data,
   backprojecting the filtered date to obtain a digitized image,
   feeding back said digitized image,
   taking the two-dimensional Fourier transform of the image during the feedback step,
   interpolating the two-dimensional Fourier transform of the image to obtain values of the transform along radial lines, and
   forming the one-dimensional inverse Fourier transform of the radial lines to obtain reprojection data for said image.

7. The method of claim 6 including using the reprojection data for the image to correct artifacts.

8. The method of claim 6 wherein the step of taking the two-dimensional Fourier transform of the image includes using discrete Fourier transforms.

9. The method of claim 6 wherein the step of taking the two dimensional Fourier transform of the image includes taking the Fast Fourier transform of the image.

10. A method for correcting for artifacts in images obtained in computerized tomographic devices, said method including the steps of:
    detecting radiation attenuated by passing through a subject,
    preprocessing said detected radiation to obtain data corresponding to projections of said detected radiation,
    filtering said data,
    backprojecting the filtered data to obtain a digitized image,
    feeding back said digitized image,
    taking the two-dimensional Fourier transform of the image during the feed-back step,
    interpolating the transform of the image to obtain the values of the transform along radial lines,
    forming the one-dimensional inverse Fourier transform of the radial lines to obtain reprojections,
    combining said reprojections with the data corresponding to projections, and
    filtering and backprojecting the combined data to form a corrected image.

11. The method of claim 10 wherein the two-dimensional Fourier transform is a discrete operation.

12. The method of claim 11 including the step of completing the discrete Fourier transform using a Fast Fourier transform.

* * * * *